United States Patent

[11] 3,585,405

[72] Inventor Robert L. Stettiner
Lexington, Mass.

[21] Appl. No. 806,248
[22] Filed Mar. 11, 1969
[45] Patented June 15, 1971
[73] Assignee Hewlett-Packard Company
Palo Alto, Calif.

[54] ULTRASONIC TRANSMITTER SWITCHING CIRCUIT
3 Claims, 8 Drawing Figs.

[52] U.S. Cl. ........ 307/252C, 307/252 J, 307/252 K, 307/246, 328/67, 340/15
[51] Int. Cl. ........ H03k 17/00
[50] Field of Search ........ 307/252.22, .51, .53, 246, 268; 340/15; 328/67

[56] References Cited

UNITED STATES PATENTS 3,025,411 3/1962 Rumble ........ 328/67 X
3,387,257 6/1968 Brech ........ 307/246 X

*Primary Examiner*—Donald D. Forrer
*Assistant Examiner*—John Zazworsky
*Attorney*—Stephen P. Fox

ABSTRACT: Two ultrasonic transducers are pulsed from respective capacitor discharge circuits which are driven from a single high voltage, high speed, silicon-controlled rectifier switch. Low-power current shunting switches are operable to selectively disable the capacitor discharge circuits and their associated transducers.

INVENTOR.
ROBERT L. STETTINER
BY Stephen P. Fox
AGENT

ULTRASONIC TRANSMITTER SWITCHING CIRCUIT

BACKGROUND OF THE INVENTION

In a typical ultrasonic pulse-echo system, a transducer transmits high frequency pulses and receives echo signals which are time delayed in accordance with the acoustic impedance of the medium through which the pulses travel. The high frequency pulses may be produced by first charging a capacitor with a high potential, and then rapidly discharging the capacitor through the transducer. The capacitor discharging circuitry typically includes a gated switch such as a silicon-controlled rectifier having high-power and high-switching speed capabilities. Gated switches of this type are difficult and expensive to manufacture.

In prior art ultrasonic applications wherein two or more transducers were used to transmit high frequency pulses, the transducers were pulsed through the use of separate high-speed, high-power gated switches. The use of a multiplicity of gated switches, i.e., one switch for each transducer, undesirably increases the cost of the ultrasonic system.

SUMMARY OF THE INVENTION

The present invention features an ultrasonic pulse transmitter circuit for driving a plurality of transducers with the use of a single high-power, high-speed gated switch. Only one such switch is used, regardless of the number of transducers in the system, so that costly multiplication of the switches and associated components is avoided. The illustrated embodiment of the invention includes a plurality of chargeable capacitor circuits associated respectively with a plurality of transducers. The capacitors are first charged from high voltage sources and thereafter discharged by a common silicon-controlled rectifier when it is gated into conduction. The capacitors, when discharged, produce high-power output pulses which excite the transducers. The invention also features a plurality of low-power, inexpensive, gate-controlled switches coupled to the capacitor circuits and operable to disable the charging of selected ones of the capacitors to thereby inhibit operation of their corresponding transducers.

DESCRIPTION OF THE PREFERRED EMBODIMENT

Figure 1:
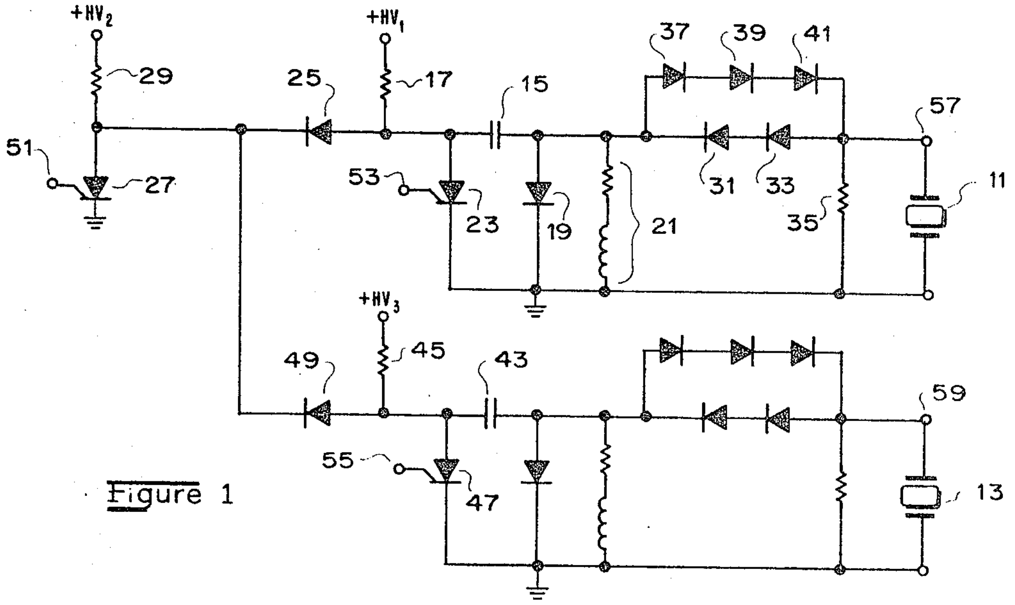
FIG. 1 is a schematic diagram of an ultrasonic transmitter system incorporating the preferred embodiment of the present invention.

Referring now to FIG. 1, there are shown two piezoelectric transducers 11, 13, each of which produces an ultrasonic pulse when suitably energized. Transducer 11 is connected through a coupling network, hereinafter described, to a capacitor 15. This capacitor is connected in a series charging circuit including a resistor 17 and the parallel combination of a diode 19 and a resistance-inductance network 21. The resistor 17 is connected to a positive high voltage source $+HV_1$ having a magnitude on the order of 600 volts, for example.

A silicon-controlled rectifier (SCR) 23 is connected to the junction point of capacitor 15 and resistor 17. When SCR 23 is gated into conduction, the capacitor charging current flowing through resistor 17 is diverted to ground so that capacitor 15 is not charged. Resistor 17 has a value sufficiently large to limit the current flow through SCR 23, and the switching speed of SCR 23 is not critical, as will become apparent from the description hereinafter. It is to be noted that the SCR 23 need have only low-power and low-switching speed capabilities, and may be substituted with some other type of gated switching device, such as a transistor.

The junction point of capacitor 15 and resistor 17 is also connected through a discharging circuit including a diode 25 and an SCR 27, the anode of the latter being suitably biased from a high voltage source $+HV_2$ through a current-limiting resistor 29. The voltage $HV_2$ is chosen to be greater than or equal to the voltage $HV_1$. While capacitor 15 is being charged from the high voltage source $+HV_1$, the SCR 27 is maintained in a nonconducting condition. Also, diode 25 is nonconducting due to the relationship of the voltages $HV_1$ and $HV_2$. After capacitor 15 is fully charged, SCR 27 is gated into conduction, to rapidly discharge capacitor 15 through diode 25. As a result, a large negative-going voltage spike is produced and is coupled to the transducer 11. In order to ensure that this voltage spike has a magnitude and rise time sufficient for energizing the transducer 11, the SCR 27 must be capable of switching a large current at a high speed.

The network for coupling the negative voltage from capacitor 15 to transducer 11 includes a pair of series connected diodes 31, 33 and a load resistor 35 connected in shunt with a transducer 11. The two diodes 31, 33 provide a voltage drop of about 1.2 volts in the forward conducting direction, which is sufficient to block any echo signals received by transducer 11 from reaching the capacitor discharge transmitting circuitry. Three diodes 37, 39, 41 are connected in parallel with diodes 31, 33 to prevent the latter two diodes from being subjected to large positive voltage spikes which might cause reverse-voltage breakdown thereof. The large positive voltage spikes may occur when SCR 27 is switched off and capacitor 15 begins charging, because diode 19 is a high voltage, high current diode and has an inherently slow turn-on characteristic. Thus, the anode of diode 19 may reach 50 volts or more, for example, before it operates as a clamp to ground.

The pulse-generating circuitry for transducer 13 is substantially identical to that for transducer 11. More specifically, a capacitor 43 is charged from a high voltage source $+HV_3$ through a resistor 45; and an SCR 47 may be gated into conduction and thereby prevent capacitor 43 from being charged. Capacitor 43 is connected through a diode 49 to the SCR 27 and may be discharged when the SCR 27 is gated into conduction, in the same manner as described hereinabove with reference to capacitor 15. The large negative-going voltage spike produced when capacitor 43 is discharged is coupled to transducer 13 by a coupling circuit having a same configuration as that for transducer 11.

FIG. 1 illustrates the capacitor discharge pulse generating circuits for only two transducers 11, 13; however, it is to be noted that any number of such circuits may be connected in parallel so that the capacitor of each circuit may be charged from a high voltage source, and discharged through a corresponding diode connected to the single SCR 27. The pulse generating circuits may be selectively disabled to thereby inhibit the transmission of ultrasonic signals by their associated transducers. This may be achieved by diverting charging current from selected ones of the capacitors by maintaining their corresponding shunt switching devices (i.e., SCRs 23, 47) in a state of conduction. The high voltage sources for charging the capacitors (i.e., $+HV_1$ and $+HV_3$) may be chosen with either the same or different magnitudes. In the latter case, the pulses delivered to the transducers will also have different magnitudes.

Figure 2:
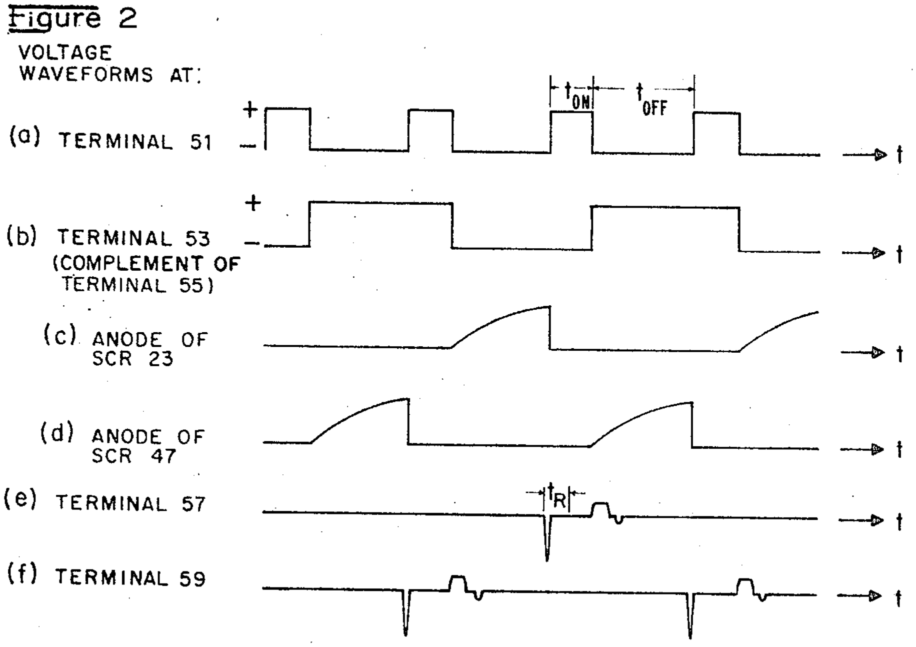
FIG. 2,(*a*)—(*f*) are voltage waveforms illustrating the operation of the system of FIG. 1.

The dynamic operation of the transmitting circuitry of FIG. 1 may be understood by reference to the waveforms shown in FIG. 2(*a*) through (*f*). FIG. 2(*a*) illustrates one type of control signal which may be applied to the gate-controlled input terminal 51 of the SCR 27. This signal operates to turn SCR 27 on and off cyclically. In FIG. 2(*b*), there is shown the switching signal applied to the gate input terminal 53 of the SCR 23. The complement of this signal is applied to the gate terminal 55 of SCR 47. These two complementary signals operate to render SCRs 23, 47 alternately conductive during successive cycles of the main switching signal applied to the gate 51 of SCR 27. During each cycle of the gating signal of FIG. 2(*a*), one or the other of the two capacitors 15, 43 will be charged. The capacitors are charged during the off-time $t_{off}$ of the SCR 27, and the voltage across the particular capacitor being charged gradually increases toward the value of the corresponding high voltage source $+HV_1$ or $+HV_3$.

Each of the SCRs 27, 23 and 47 are turned off at times when the capacitors 15, 43 are substantially discharged. At this time the anode-to-cathode currents through the SCRs are small, typically on the order of a few milliamperes. Turnoff is achieved by applying negative voltages to the SCR gate electrodes, as shown in FIG. 2,(*a*) and (*b*). This, in turn, reduces the SCR current to a level below the minimum holding current for the SCR.

As illustrated in FIG. 2,(*c*) and (*d*), the capacitors 15, 43 are alternately charged, due to the complementary operation of the SCRS 23, 47, and the voltage sources $+HV_1$ and $+HV_3$ are assumed to be equal. During the first cycle of the gating signal shown in FIG. 2(*a*), the SCR 23 is maintained conducting, thereby preventing capacitor 15 from being charged. However, at this time, SCR 47 is maintained in a nonconducting state, so that capacitor 43 is charged. During the next cycle of the gating signal of FIG. 2(*a*), the SCR 23 is held in a nonconducting state so that capacitor 15 is charged, and the other SCR 47 is held in a conducting state so that the associated capacitor 43 is maintained in a discharged condition.

Each time the SCR 27 is gated into conduction, one or the other of the two capacitors 15, 43 will be rapidly discharged. As shown in FIG. 2,(*e*), and (*f*), the large negative voltage spikes produced by the discharging capacitors are coupled to the output terminals 57, 59 associated respectively with the transducers 11, 13. When SCR 27 is gated off, one of the two capacitors 15, 43 will begin charging from its corresponding high voltage source. This small dual polarity waveform following each of the negative voltage spikes, as shown in FIG. 2,(*e*) and (*f*), is caused by the "ringing" effect of the capacitor circuitry when the charging cycle is initiated at the end of the on-time, $t_{on}$ of SCR 27. The positive-going portion of this waveform is clipped when the corresponding clamping diode (e.g., diode 19) begins to conduct. These small pulses are coupled to the transducers 11, 13, but they do not interfere with any echo signals which may be received thereby. This is because the on-time $t_{on}$ of SCR 27 is set to a predetermined time interval which is longer than the time $t_R$ during which an echo signal would be received in a particular application.

I claim:

1. A circuit for producing high voltage output pulses to drive selected ones of a plurality of ultrasonic transducers comprising:

a plurality of chargeable capacitor circuits each including a resistor and a capacitor connected in series;

means for connecting each of said chargeable capacitor circuits to a different one of said transducers;

circuits source means providing voltages for charging the capacitor of each of said chargeable capacitor circuits through the resistor corresponding to each capacitor;

means for rapidly discharging said chargeable capacitor circuits, said discharging means including: gated switch means including a gate-controlled rectifier; and asymmetrically conducting means for coupling each of said chargeable capacitor circuits in parallel to said gated switch means;

said gate-controlled rectifier being operable to switch into a high current conducting state, thereby to discharge the capacitors of said chargeable capacitor circuits through said asymmetrically conducting coupling means; and means for selectively disabling one or more of said chargeable capacitor circuits, said selective disabling means including a plurality of gate-controlled switches respectively connected to the capacitors of said chargeable capacitor circuits, each of said gate-controlled switches being operable in a conducting state to divert said charging current and thereby to maintain the corresponding capacitor in a discharged inactive condition.

2. The combination of claim 1, said gated switch means being a single silicon-controlled rectifier having a main current-carrying electrode; and said asymmetrically conducting means including a plurality of diodes respectively connecting the capacitors in said chargeable capacitor circuits to said main current-carrying electrode of said single silicon-controlled rectifier.

3. The combination of claim 1, wherein said gate-controlled switches of said selective disabling means are each a silicon-controlled rectifier.

UNITED STATES PATENT OFFICE
CERTIFICATE OF CORRECTION

Patent No. 3,585,405 Dated June 15, 1971

Inventor(s) Robert L. Stettiner

It is certified that error appears in the above-identified patent and that said Letters Patent are hereby corrected as shown below:

Column 4, line 9, "circuits source means" should read -- source means --.

Signed and sealed this 30th day of November 1971.

(SEAL)
Attest:

EDWARD M.FLETCHER,JR.
Attesting Officer

ROBERT GOTTSCHALK
Acting Commissioner of Patents

FORM PO-1050 (10-69)
0-160010

USCOMM-DC 60376-P69
☆ U.S. GOVERNMENT PRINTING OFFICE : 1969 O—366-334